Aug. 29, 1933.  G. D. BOWER  1,924,907
ELECTRICAL CONTROL SYSTEM
Filed May 18, 1931
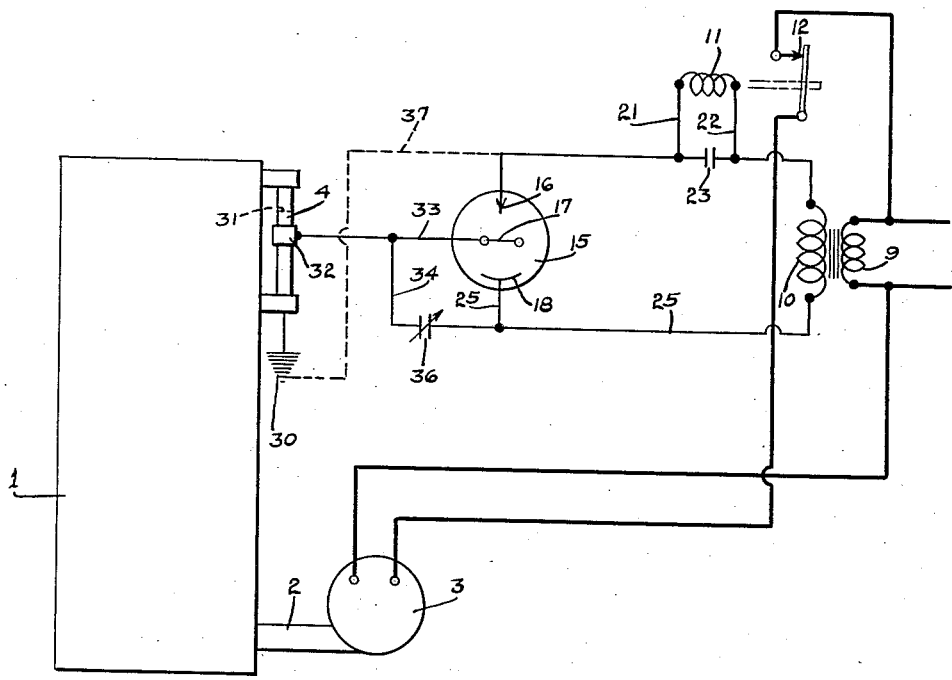
INVENTOR
GEORGE D. BOWER
BY Paul, Paul Moore
ATTORNEYS Patented Aug. 29, 1933

1,924,907

UNITED STATES PATENT OFFICE 1,924,907

ELECTRICAL CONTROL SYSTEM

George D. Bower, Columbia Heights, Minn., assignor to Minneapolis-Honeywell Regulator Company, Minneapolis, Minn., a corporation of Delaware Application May 18, 1931. Serial No. 538,371

14 Claims. (Cl. 122—504)

This invention relates generally to control systems and particularly to the use of a space discharge device as sensitive electrical means controllable by variation and/or for controlling variation in fluid levels, and adapted, in turn, to control one or more other devices.

An important feature of the invention is the use of a grid glow tube as means responsive to variations in the levels of liquids, or of fluids in general. The device finds valuable application by having the tube thus controlled adapted, in turn, to control a suitable relay or equivalent device which is, in turn, capable of effecting a motion or preventing motion (or other physical change) in the liquids or fluids. The device finds valuable application in controlling steam heating plants, which include means for supplying fuel, and a water gauge glass, with any suitable means by which the glass acting as a dielectric can control the tube, along with any suitable means by which the tube can, in turn control the fuel supply, and in which at or near a predetermined liquid level, tube glow is prevented and fuel supply is cut off, and in which when the water is at or near some other predetermined level, heat is supplied. In this embodiment, the device may be viewed as a low-water detector, and safety device for steam boilers.

There is no intention to limit the broader aspects of the invention to the drawing disclosure, although this detailed disclosure is also claimed as one valuable embodiment of the inventive concept.

Features and advantages are pointed out in the description of the drawing forming a part of this application, and in said drawing the single figure diagrammatically represents a steam heating system in which the level of the water in the gauge glass controls (by means of a grid glow tube) the heat supply or feed water supply for the boiler.

What may be termed two relays are used in the present embodiment of the invention, one having a very minute current capacity, and the other a very much larger current capacity, with connections by means of which the former is controlled by variations in liquid level, and by means of which the latter is controlled by the former to prevent further physical (in this instance heating) action upon the liquid when it reaches a predetermined low level, or other physical condition.

Numeral 1 diagrammatically indicates a furnace and boiler; numeral 2, means for supplying heat thereto including, for example, a burner motor 3, and water gauge glass 4 for the boiler.

The system herein is controlled by the liquid level in the gauge tube 4 acting through the gauge tube as a dielectric; and includes a power source such as the secondary winding 10 of a transformer having primary 9, along with a relay, the coil of which is indicated at 11. The relay controls contact 12, which controls a circuit to fuel motor 3, or which controls the feed water supply, not shown. The grid glow tube is indicated at 15 and includes an anode 16, a grid 17 and cathode 18.

The grid glow tube is used as a power multiplying or amplifying device to control a power circuit of which the tube forms a part, and in which the tube can be controlled by a device which passes a very small amount of current.

That part of the tube which is controlled by liquid or fluid level through the tube 4 as a dielectric, operates only on a fraction of one milli-ampere. Thus a very small control current can be used to control a main circuit flow through the grid glow tube causing it to act as a relay to pass current of much larger magnitude than that of the control instrument, and, in this instance, energizes the coil of the relay, or to control an equivalent device.

It will be understood that the gauge tube 4 may be of any non-conducting or dielectric material, and that any fluid adapted for the purpose may take the place of water to produce what may be considered a variable condenser action.

The control circuit includes suitable connections for controlling grid charges in a manner to pass or prevent passage of current in the power circuit, or controlled circuit which includes the relay.

The embodiment may be said to include three circuits, first the circuit by which the grid glow tube controls the relay; second, the circuit by which grid charges are controlled by variations in liquid level; and third, the circuit by which the relay controls some other suitable device which affects the condition of the liquid.

The tube-controlled, or relay control circuit includes: conductor 21, connecting the anode 16 with one side of the relay coil 11; conductor 22 connecting the opposite side of the coil 11 with the plus side of the secondary 10; a smoothing condenser 23 across 21—22; and conductor 25 connecting the negative side of the secondary 10 with the cathode 18.

Part of the circuit for the tube by which grid charges are controlled include: ground connection 30 for gauge tube 4; water 31 (or other suitable medium) in the tube; tube 4 of suitable dielectric material; metal sleeve 32, or equivalent device on the outside of the tube; conductor 33 connecting the sleeve to the grid 17; conductor 34 connecting line 33 with line 25 and, therefore, with the cathode 18; and variable condenser 36 in line 34. The metal sleeve is a feature because it provides a metallic means which is adjustable on the tube to various levels.

It is to be noted that there is no direct metallic connection between the liquid and the grid glow tube, for controlling the grid charge (or negative charge) to either dissipate or allow it to accumulate.

The water gauge glass is usually grounded as at 30, and the current can pass to the anode 16 by way of the piping in which the supply lines are contained. A direct metallic return indicated by dotted lines at 37 could be substituted for the above mentioned capacity return, but if a short-circuit occurred between the grid electrode (or metal sleeve in this case) and the boiler, the grid glow tube would be seriously over-loaded, resulting in permanent damage.

Operation

The drawing indicates that condition in which the water level is normal, and in which the tube is glowing and passing sufficient current to hold relay 11 closed and contact 12 closed, so that element 3 is acting to maintain boiler operation. As now operating, when the water level in the water glass tube is within or above the metal sleeve, a capacity path for the dissipation of the negative charge on the grid is formed from the grid 17 to the sleeve 32 through the glass 4, water 31, to the ground 30, returning therefrom to the anode 16 through the capacities afforded by conductor conduit, transformer, relay cases and other parts, not shown. Condenser 36 and connection between grid and cathode constitute means whereby the minus charge of the grid can be varied. The charge which is dissipated by the metal sleeve must be equal to the entire accumulated negative charge of the grid, plus that of condenser 36. By increasing the capacity of the condenser 36, the amount of current which the metal sleeve must dissipate is increased. By this means, the tube can be regulated so that it will not glow until the capacity of this dissipating path reaches a certain desired figure. This provides means whereby to vary the sensitivity of the tube.

By adjusting condenser 36, compensation can be made for variation in quality of materials, variation in machining and/or formation of the parts, and variations in assembly during manufacture, and variations in installation on the boiler after delivery to the customer, including spacing of parts, etc.

Moreover, the condenser 36 enables one to so adjust the sensitivity of grid dissipation that outside influences will not adversely affect the control to obtain premature glow of the grid, as before the water has assumed the proper relation to the sleeve, but to so operate that glow is unfailingly obtained when the water does assume some predetermined relation to the sleeve.

When the liquid level falls below the element 32, or to some predetermined level for which the device is adjusted, negative charge accumulates on the grid and passage of current to the coil 11 is prevented, resulting in deenergization of the coil, opening of contact 12, and stopping fuel feed or other equivalent control action, or modifying such action.

It is evident that the tube 4 may be properly considered to be a portion of the wall of the vessel 1. It is also evident that this wall-forming portion or its equivalent is part of a capacity device, and that the connection 33 is a grid leak control connection by which variation in capacity, resultant from the motion of the liquid relative to the capacity device, controls the space-discharge device to operate a heating means which is associated with the liquid holding device or boiler of which the tube 4 is a part. It is to be further noted that all that is necessary is that a capacity device be so associated with the wall of the vessel that the movement of the liquid will vary its capacity to control the space-discharge device, and particularly to control a grid-glow-tube.

An important feature, therefore, of this invention is the use of a capacity connection to obtain control by means of a liquid either dielectric or non-dielectric, without passing wiring connections through or having mechanical elements move through the wall of the vessel which contains the liquid, and particularly where that vessel must be closed.

It is further noted that the grid is connected to a member which is part of and which may, as shown herein, be adjustable with reference to the capacity device in correspondence to the liquid level at which it is desired to operate.

I claim as my invention:

1. In combination a liquid conduit, a grid glow tube, and electrical connections by means of which the tube is energized when the liquid is at or near a selected level and by means of which said tube is de-energized when the liquid is at or near another selected level, and including a control connection for dissipating negative charges on the grid in which connection the liquid conduit functions as a dielectric.

2. In combination a liquid conduit, a grid glow tube, and electrical connections by means of which the tube is energized when the liquid is at or near a selected level and by means of which said tube is de-energized when the liquid is at or near another selected level, and including a control connection for dissipating negative charges on the grid in which connection the liquid conduit functions as a dielectric, and means associated with the grid controlling circuit for adjusting the degree of negative charge dissipation.

3. In combination, a liquid conduit, a space discharge device, and electrical connections by means of which the device is energized when the liquid is above a certain level, and by means of which said device is de-energized when the liquid is at or near that level, and including a control connection in which the liquid conduit functions as a dielectric.

4. In combination, a liquid conduit, a space discharge device, and electrical connections by means of which the device is energized when the liquid is above a certain level, and by means or which said device is de-energied when the liquid is at or near that level, and additional electrical connections by which said device is adapted when energized to transfer its electrical effects to another control device.

5. In combination, a heating system including a boiler having a water gauge glass, means for supplying heat to the system, a relay for controlling the heat supplying means, a space discharge device and electrical connections including said glass as a dielectric by means of which said device is capable of closing the relay, and by means of which when the water in the tube is above a certain level, the relay can be maintained in closed condition and by means of which the relay is opened when the water assumes that level.

6. In combination, a water gauge glass having a metal member secured to its outer surface, a relay, a grid-glow tube, electrical connections including the metal member by means of which connection the tube when glowing is capable of energizing the relay, by means of which the tube is caused to glow when water in the gauge glass assumes a certain relation to the metal member, and by means of which the glow of the tube is stopped when the water assumes another relation to said member.

7. In combination a water gauge tube having the character of a dielectric, and a metallic member secured to the outer surface of the tube, a relay, a grid glow tube, and electrical connections by means of which the tube, when glowing, is capable of energizing the relay, and by means of which the tube is caused to glow when the water in the gauge tube assumes a certain relation to the metal member, and to prevent glow when the water assumes a certain other relation to the metal member.

8. A device of the class described comprising a boiler and a water gauge glass therefor, a metallic member arranged against the outer surface of the glass adjacent the low-water level thereof, a burner for heating the boiler, a relay for controlling the burner, a grid glow tube, and electrical connections between the metallic member, glass, grid glow tube and relay by means of which the tube when glowing is capable of energizing the relay and by means of which tube glow is prevented when the water assumes a certain low level relation to the metal member, and by means of which tube glow is obtained as long as a certain high level relation between water and metal member is maintained.

9. A device of the class described comprising a liquid gauge glass having a metal member against its outer surface, a grid glow tube, a relay, and electrical connections between the metal member, gauge glass, grid glow tube and relay by means of which variation in liquid level with respect to the metal member energizes or de-energizes the relay.

10. In combination a liquid conduit having the character of a dielectric, a metallic member secured to the outer side of the conduit, a relay, a grid glow tube having an anode grid and cathode, a source of power, and electrical connections with the source of power including therein in series said anode, relay, and cathode, electrical connections between said metal member and grid, and a capacity connection between said member and said cathode, and a ground connection for said water gauge tube.

11. In combination a liquid conduit having the character of a dielectric, a metallic member adjustably secured to the outer side of the conduit, a relay, a grid glow tube having an anode grid and cathode, a source of power, and electrical connections with the source of power including therein in series said anode relay and cathode, electrical connections between said mechanical member and grid and a capacity connection between said member and said cathode, and a ground connection for said water gauge tube.

12. In combination, a liquid conduit, a space discharge device, including a grid, electrical connections by means of which the device is energized when liquid is at or near the selected level and by means of which said device is de-energized when the liquid is at or near another selected level, and including a control connection for dissipating negative charges of the grid in which connection the liquid conduit functions as a di-electric.

13. In combination, a liquid conduit having the character of a di-electric, a metallic member secured to the outer side of the conduit, a relay, a grid-glow-tube having an anode, grid and cathode, a source of power, and electrical connections with the source of power including therein in series said anode, relay and cathode, electrical connections between said mechanical member and grid, and a ground connection for the said liquid conduit.

14. A vessel having a portion of its wall forming a part of a capacity device, means for supplying heat to the vessel, a space discharge device, and electrical connections by which this device controls the heat supplying means including circuit elements by which variations in the capacity device resultant from motion of liquid in the vessel control the grid for causing the space discharge device to pass current to operate the heat controlling means.

GEORGE D. BOWER.